(12) United States Patent
Min et al.

(10) Patent No.: US 7,746,753 B2
(45) Date of Patent: Jun. 29, 2010

(54) METHOD OF REPRODUCING INFORMATION USING SEMICONDUCTOR PROBE AND DEVICE ADOPTING THE SEMICONDUCTOR PROBE

(75) Inventors: Dong-ki Min, Seoul (KR); Seung-bum Hong, Seongnam-si (KR); Hong-sik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 11/650,940

(22) Filed: Jan. 9, 2007

(65) Prior Publication Data

US 2007/0159193 A1    Jul. 12, 2007

(30) Foreign Application Priority Data

Jan. 9, 2006    (KR) .................. 10-2006-0002370

(51) Int. Cl.
*G11B 9/00* (2006.01)
(52) U.S. Cl. .................... 369/126; 369/47.19
(58) Field of Classification Search ............. None
See application file for complete search history.

(56) References Cited

U.S. PATENT DOCUMENTS

| | | | | |
|---|---|---|---|---|
| 6,477,132 B1 * | 11/2002 | Azuma et al. | ............... | 369/126 |
| 7,141,999 B2 | 11/2006 | Park et al. | | |
| 7,221,639 B2 * | 5/2007 | Onoe et al. | ............... | 369/126 |
| 7,319,224 B2 * | 1/2008 | Park et al. | ............... | 250/306 |
| 7,423,954 B2 * | 9/2008 | Mejia | ............... | 369/126 |
| 7,479,212 B2 * | 1/2009 | Hong et al. | ............... | 205/68 |
| 2003/0107058 A1 * | 6/2003 | Lim et al. | ............... | 257/255 |
| 2003/0142614 A1 * | 7/2003 | Cho et al. | ............... | 369/126 |
| 2004/0047246 A1 * | 3/2004 | Onoe et al. | ............... | 369/13.11 |
| 2005/0052984 A1 * | 3/2005 | Hong et al. | ............... | 369/126 |

FOREIGN PATENT DOCUMENTS

| | | |
|---|---|---|
| CN | 1653605 A | 8/2005 |
| JP | 04-181642 A | 6/1992 |
| JP | 09-282725 A | 10/1997 |
| JP | 2005-524925 A | 8/2005 |
| WO | 2004/097822 A1 | 11/2004 |

OTHER PUBLICATIONS

Japanese Office Communication dated Dec. 1, 2009.

* cited by examiner

*Primary Examiner*—Paul Huber
(74) *Attorney, Agent, or Firm*—Sughrue Mion, PLLC

(57) ABSTRACT

An information reproducing apparatus and a method using a semiconductor probe are provided. The information reproducing apparatus includes a semiconductor probe including a semiconductor tip including a channel varying with an electric field generated by an information recording medium; a modulator applying a high frequency modulation signal to the semiconductor probe to form a modulation electric field so as to modulate an information signal induced by the electric field; a signal detector detecting a signal generated by the semiconductor probe; and a demodulator extracting the information signal modulated by the modulation electric field from the signal detected by the signal detector.

24 Claims, 8 Drawing Sheets

METHOD OF REPRODUCING INFORMATION USING SEMICONDUCTOR PROBE AND DEVICE ADOPTING THE SEMICONDUCTOR PROBE

CROSS-REFERENCE TO RELATED PATENT APPLICATION

This application claims priority from Korean Patent Application No. 10-2006-0002370, filed on Jan. 9, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to reproducing information using a semiconductor probe, and more particularly, to a method for separating an information signal generated by a variation in an electric field of a medium from a noise signal generated by thermal instability and a device using the method.

2. Description of the Related Art

Demand for highly integrated, nonvolatile miniature recording media has increased in response to the demands for compact products such as portable communication devices, electronic notebooks, or the like. It is not easy for existing hard discs to be made compact, and it is difficult to highly integrate flash memories. Thus, information storing apparatuses and methods using scanning probes have been studied.

Probes are used for several scanning probe microscopy (SPM) techniques. For example, probes are used in a scanning transmission microscope (STM), which reproduces information obtained by detecting a current with respect to differences in a voltage applied between a probe and a sample, an atomic force microscope (AFM) using an atomic force between a probe and a sample, a magnetic force microscope (MFM) using a magnetic force between a magnetic field of a sample and a magnetized probe, a scanning near-field optical microscope (SNOM) improving a limit of resolution caused by a wavelength of visible rays, an electrostatic force microscope (EFM) using an electrostatic force between a sample and a probe, and the like, Lim, Geunbae et al. have suggested an electric field effect probe detecting surface charges of a medium using an electric field (Refer to U.S. Pat. No. 6,521,921). The suggested electric field effect probe has an electric field effect transistor type semiconductor tip forming a carrier channel using an electric field effect. Here, an electric field applied to the semiconductor tip is formed by charges or dipole moments trapped on the surface of a medium. If charges trapped on a disc form an electric field having an intensity larger than or equal to a threshold electric field intensity in correspondence with recorded information, a channel is formed, and thus the resistance of the electric field effect probe becomes low. As a result, recorded information can be reproduced according to variations in resistance corresponding to the recorded information.

Park, Hong-sik et al. have suggested a resistive semiconductor probe having a semiconductor tip with a slightly doped channel area (Refer to U.S. Publication No. 2005/0231225A1). The semiconductor tip of the resistive semiconductor probe is slightly doped with a dopant so that a weak current flows when an electric field is not formed, and thus the resistive semiconductor probe can detect a weak electric field. In other words, in the suggested resistive semiconductor probe, the semiconductor tip has low mobility so that carriers move in a channel when an electric field is not formed. Thus, a high sensitivity can be achieved with respect to a weak electric field.

However, such a resistive semiconductor tip is sensitive to heat and thus has a resistance that greatly varies with variations in temperature. A variation in resistance caused by thermal instability is a disadvantage of the resistive semiconductor probe. In other words, an instable temperature variation of the resistive semiconductor probe causes an instable current variation, i.e., a noise current, in the resistive semiconductor tip. Such a noise current is generated by a variation in temperature and occurs regardless of an electric field. The instable temperature variation of the resistive semiconductor probe is caused by an instable variation in a gap or a contact area between a medium and the resistive semiconductor probe or a non-uniform, discontinuous discharge of heat generated by the semiconductor probe or a cantilever supporting the semiconductor probe.

The gap between the resistive semiconductor probe and the medium is required to be uniformly maintained to inhibit the instable variation in the temperature of the resistive semiconductor probe. To uniformly maintain the gap, a surface of the medium facing the resistive semiconductor probe is made very smooth. Although the degree of smoothness of the surface of the medium is maximized, sufficient, effective thermal stability cannot be secured due to the limit of the degree of smoothness. Although the gap between the medium and the resistive semiconductor probe varies within a range of several nm, a noise current is generated due to variations in temperature. Also, although the surface of the medium is smooth like a mirror, the degree of smoothness of the surface of the medium cannot be adjusted within the range of several nm. As another method, the gap between the resistive semiconductor probe and the medium may be made sufficiently large. However, since a resistive semiconductor probe having a high aspect ratio is difficult to manufacture, the possibility of the gap being large is low. Thus, a noise current may be generated by thermal instability in the resistive semiconductor probe suggested by Lim, Geunbae et al.

Accordingly, in order to effectively read information recorded by charges from a medium using a semiconductor probe in which a flow of current is controlled by an electric field effect, a method of effectively reproducing a signal by improving a signal-to-noise ratio (SNR) or the like in spite of a noise current generated by thermal instability of the semiconductor probe is required.

SUMMARY OF THE INVENTION

The present invention provides an apparatus and a method for effectively reproducing information using a semiconductor probe susceptible to thermal instability, without making a specific change to the structure of the semiconductor probe.

According to an aspect of the present invention, there is provided an information reproducing apparatus using a semiconductor probe, the apparatus including the semiconductor probe including a semiconductor tip including a channel varying with an electric field generated by an information recording medium; a modulator applying a high frequency modulation signal to the semiconductor probe to form a modulation electric field so as to modulate an information signal induced by the electric field; a signal detector detecting a signal generated by the semiconductor probe; and a demodulator extracting the information signal modulated by the modulation electric field from the signal detected by the signal detector.

The semiconductor probe may include a tip formed of a p-type semiconductor and a cantilever having an end portion on which the tip is provided and formed of a p-type semiconductor. Here, a portion at the peak of the tip includes the channel formed by the electric field and source and drain areas which are doped with n+-type impurities and formed at both inclined surfaces of the portion at the peak of the tip.

The modulator may include a high frequency modulation signal generator and an electrode provided in the cantilever, the electrode receiving the high frequency modulation signal from the high frequency modulation signal generator. The channel area may be n-type semiconductor being doped with an n-type impurities to a lower density than the source and drain areas.

The high frequency modulation signal may be a sine wave signal and may be a high frequency signal at least 5 times the frequency of the electric field generated by the information recording medium.

The demodulator may include a multiplier multiplying the signal detected by the signal detector by a demodulation signal; and a low pass filter (LPF) extracting a signal of a frequency domain lower than a predetermined frequency from a signal output from the multiplier. The demodulation signal may have an approximately identical frequency to the modulation signal and an approximately identical phase to the signal detected by the signal detector. A cut-off frequency of the LPF may be at least 10 times lower than the frequency of the modulation signal.

The signal detector may include a voltage divider applying a divided voltage to the semiconductor probe to extract the signal. The voltage divider may be a bridge circuit including one or more resistors and the semiconductor probe or may be an inverting amplifier circuit including one or more resistors and an operational amplifier forming a feedback loop through the semiconductor probe. The signal detector may further include a differential amplifier to remove an offset voltage generated by the voltage divider.

According to another aspect of the present invention, there is provided a method of reproducing information from an information recording medium using a semiconductor probe including a semiconductor tip including a channel varying with an electric field generated by the information recording medium, the method including applying a high frequency modulation signal to the semiconductor probe to form a modulation electric field so as to modulate an information signal induced by the electric field; detecting a signal generated by the semiconductor probe; and extracting the information signal modulated by the modulation electric field from the detected signal.

The extracting of the information signal modulated by the modulation electric field from the detected signal may include multiplying the detected signal by a demodulation signal; and extracting a signal of a frequency domain lower than a predetermined frequency from a signal obtained by the multiplication. The demodulation signal may have an approximately identical frequency to the modulation signal and an approximately identical phase to the signal detected by the signal detector.

In detecting the signal generated by the semiconductor probe, a divided voltage may be applied to the semiconductor probe. The extracting of the signal of the frequency domain lower than the predetermined frequency from the signal obtained from the multiplication may include removing an offset voltage from the divided voltage and amplifying the detected signal.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Hereinafter, an information reproducing apparatus and a method using a semiconductor probe according to exemplary embodiments of the present invention will be described in detail with reference to the attached drawings.

Figure 1A:
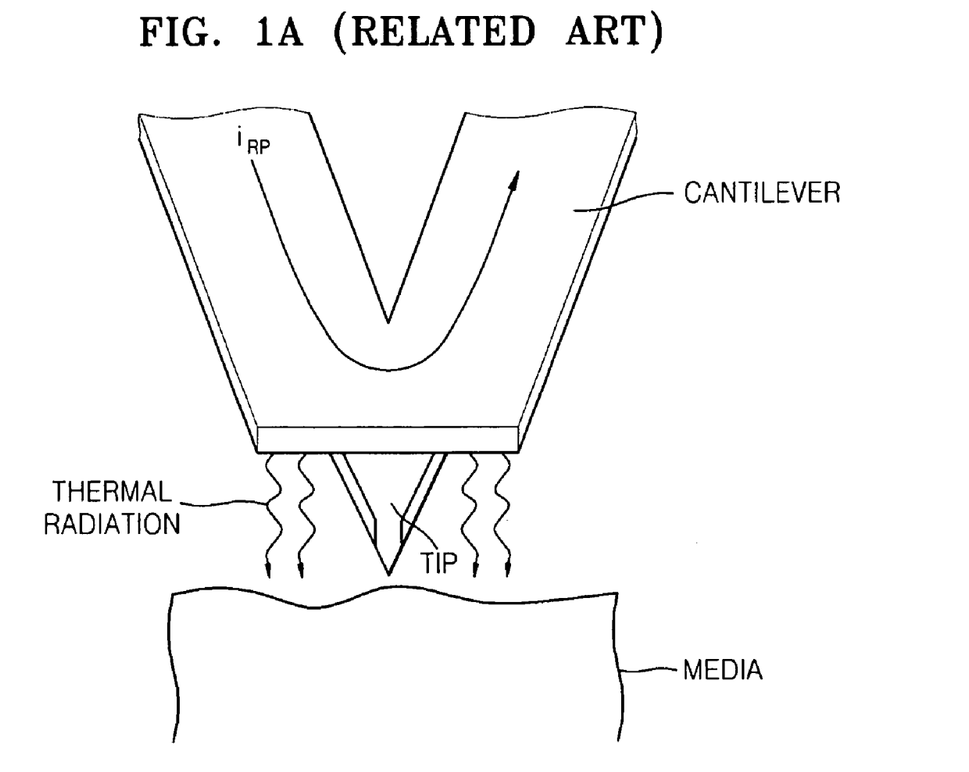
FIG. 1A is a view illustrating a relationship between a general electric field effect type semiconductor probe and a medium.

FIG. 1A is a view illustrating a relationship between a general electric field effect type semiconductor probe and a medium. As shown in FIG. 1A, the general electric field effect type semiconductor probe includes a cantilever and an electric field effect transistor type semiconductor tip formed at a front end of the cantilever to face a surface of a medium. Here, heat generated by the cantilever is radiated toward the medium. Also, as a gap between the cantilever and the surface of the medium varies with the roughness of the surface of the medium, the amount of radiated heat varies. As a result, thermal resistances vary in the cantilever and the semiconductor tip fixed to the cantilever. The thermal resistance variations affect a total current $i_{RP}$ of the general electric field effect type semiconductor probe.

Figure 1B:
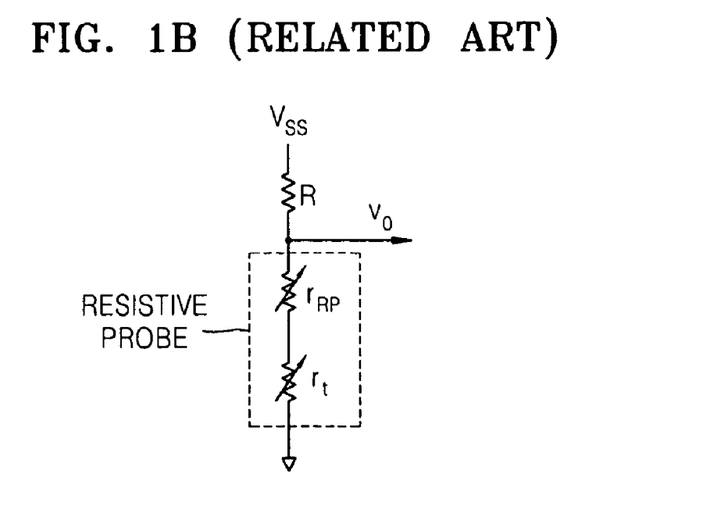
FIG. 1B is an equivalent circuit diagram of a general electric field effect type semiconductor probe.

FIG. 1B is an equivalent circuit diagram of a resistive probe considering variations in a thermal resistance $r_t$ and an ohmic resistance $r_{RP}$ of the resistive probe with an electric field. According to the equivalent circuit, an output voltage Vo is obtained as in Equation 1:

$$V_o = \frac{r_{RP} + r_t}{R + r_{RP} + r_t} V_{ss} \qquad (1)$$
$$\approx \frac{r_{RP} + r_t}{R + R_o} V_{ss}$$

wherein R denotes a bias resistance, and Vss denotes a bias voltage.

As shown in Equation 1 above, a variation in the thermal resistance $r_t$ affects the output Vo. In the present invention, a component varying with variations in thermal resistance is separated from the output voltage Vo to improve an SNR.

Figure 2A:
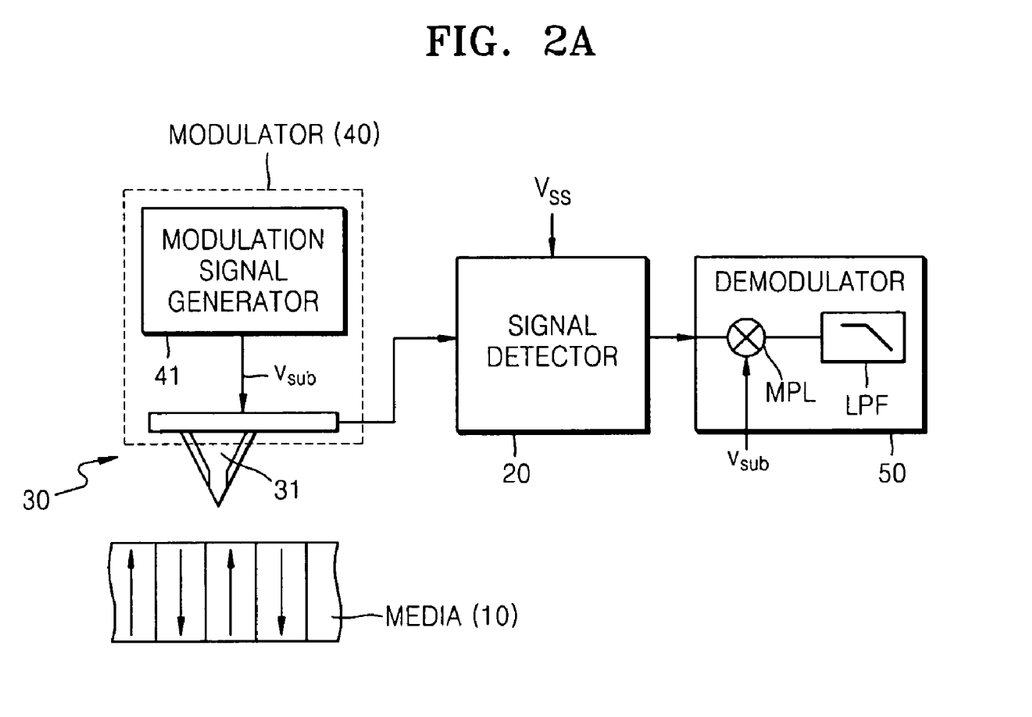
FIG. 2A is a view illustrating a schematic configuration of an information reproducing apparatus according to an exemplary embodiment of the present invention.

FIG. 2A is a view illustrating a schematic configuration of an information reproducing apparatus according to an exemplary embodiment of the present invention.

A semiconductor probe 30 having an electric field effect semiconductor tip 31 is disposed at a predetermined distance from a medium 10 formed of a ferroelectric substance and storing information in a polarization domain. An output from the semiconductor probe 30 is connected to a signal detector 20 connected to a demodulator 50. Here, the signal detector 20 is a kind of signal processing unit that extracts a modulation signal including an information signal from variations in a current in the semiconductor probe 30. The semiconductor probe 30 is connected to a modulator 40 modulating a current induced by charges trapped by polarization of the medium 10, i.e., the information signal. The modulator 40 generates a sine wave having a predetermined frequency and forms a modulation electric field in a channel area of the electric field effect semiconductor tip 31 (30). The information signal is modulated by the modulation electric field. The signal detector 20 detects the modulated signal and a signal generated by the semiconductor probe 30 and then passes the modulated signal and the signal through the demodulator 50. Only the signal of the detected signals modulated by the modulator 40 is separately demodulated by the demodulator 50. In other words, according to an exemplary embodiment of the present invention, an information signal is modulated by a high frequency modulation signal, but a noise signal generated by variations in thermal resistance is not modulated. As a result, the information signal and the noise signal are separated from each other in a demodulator.

The separation of the information signal and the noise signal, i.e., the modulation and demodulation of the information signal, will be described in detail later. A bias voltage Vss is applied to the signal detector 20 so as to apply a driving voltage to the semiconductor probe 30. The bias voltage Vss may be directly applied to the semiconductor probe 30 without passing through the signal detector 20. The bias voltage Vss must be applied to the semiconductor probe 30 so that the semiconductor probe 30 can read information from a recording medium.

Elements of the information reproducing apparatus shown in FIG. 2A according to the exemplary embodiment of the present invention are functionally separated from one another but may be designed to be functionally integrated. Also, the information reproducing apparatus may include additional functions.

The semiconductor probe 30 may be a generally well-known electric field effect transistor type probe. For example, the semiconductor probe 30 may be a scanning probe having a field effect transistor channel disclosed in U.S. Pat. No. 6,521,921 or a semiconductor probe with a resistive tip disclosed in U.S. Publication Pat. No. 2005/0231225A1.

Figure 2B:
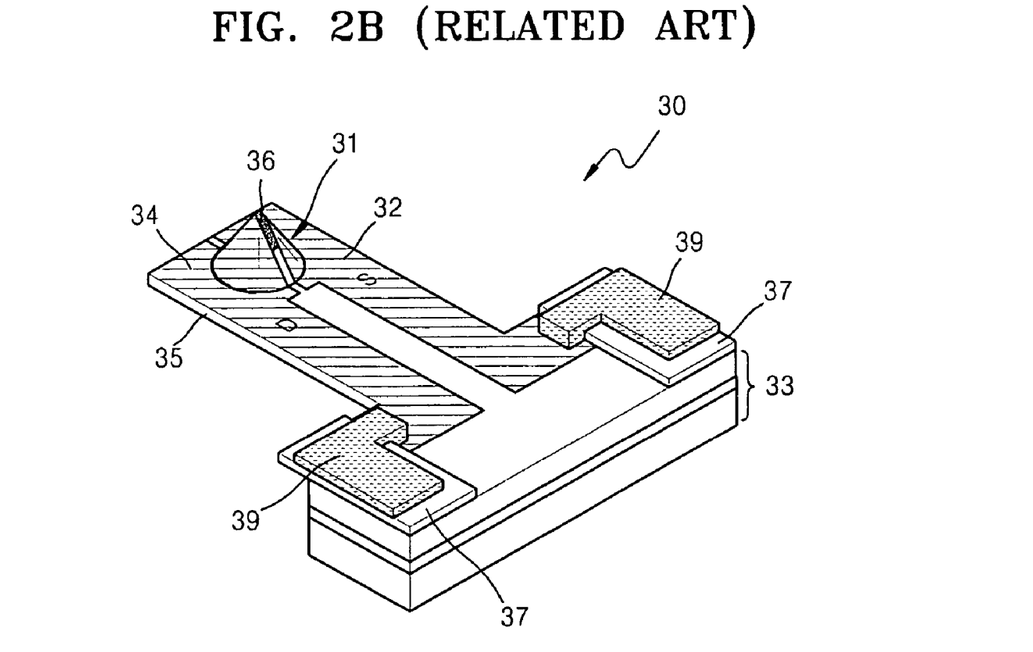
FIG. 2B is a schematic perspective view of an electric field effect type semiconductor probe used in a related art information reproducing apparatus.

Types of probes other than the two types of conventional probes described above can be applied to the information reproducing apparatus and method of the present invention as long as a modulation electric field is formed at the semiconductor tips of such probes. Thus, most electric field effect semiconductor probes have such a structure using the modulation electric field. In order to form an electric field in a structural channel area necessary for forming a modulation electric field, an element such as a substrate having a channel area in which a modulation electric field is formed or an electrode separately formed on the substrate is needed. Also, a modulation signal having a predetermined frequency is applied to the electrode. The electrode to which the modulation signal is applied may be formed on a rear surface of the substrate on which a semiconductor tip is formed or on a surface of a cantilever as shown in FIG. 2B. If a modulation signal is applied to a modulation electrode, a depletion layer is formed in a channel area. Thus, a charge channel is formed. Here, the magnitude of the charge channel, i.e., the amount of current, varies with an intensity of the modulation signal.

Figure 2C:
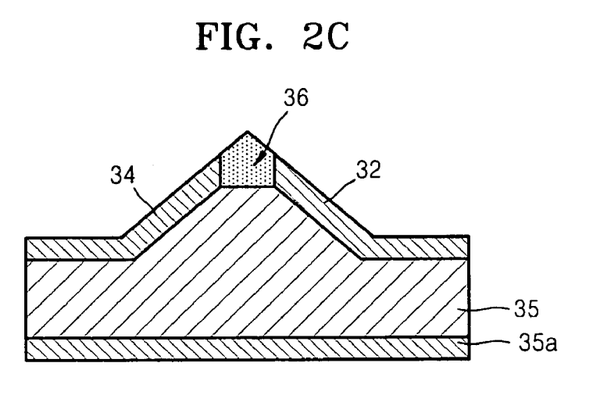
FIG. 2C is a side cross-sectional view of a tip of the electric field effect type semiconductor probe shown in FIG. 2B.

FIG. 2B is a schematic perspective view of the kind of a probe applied to the present invention, which is disclosed in U.S. Publication No. 2005/0231225A1, and FIG. 2C is a side cross-sectional view of a tip of the probe shown in FIG. 2B. Referring to FIG. 2B, an insulating layer 37 is stacked on an upper surface of a silicon substrate 33, and an electrode 39 is formed on an upper surface of the insulating layer 37. A cantilever 35 extends from a silicon layer of a surface of the silicon substrate 33, and a semiconductor tip 31 having a source area, a drain area, and a channel area formed between the source and drain areas is formed at a front end of the cantilever 35. Source and drain electrodes 32 and 34 of a transistor electrically connected to each other are formed on inclined surfaces of the semiconductor tip 31. A resistive channel area 36 doped with a second dopant to a low density and having slight mobility is formed at a peak of the semiconductor tip 31. The source and drain electrodes 32 and 34 are respectively connected to pads 39 through the cantilever 35. As described above, the resistive channel area 36 may be formed by only an electric field or may be slightly doped with dopant to have slight mobility even when an electric field is not formed. Here, a modulation signal generator 41, which is an element of a modulator 40, may be connected to the silicon substrate 33. A modulation electrode 35a may be formed on a surface of the cantilever 35 extending from the silicon substrate 33 as shown in FIGS. 2B and 2C to further effectively apply a modulation signal $v_{sub}$. The modulator 40 may include the modulation electrode 35a as shown in FIG. 2A to modulate a signal at the semiconductor tip 31 of the probe so that the modulator 40 performs a portion of functions of the probe. The structure and operation of such a resistive semiconductor can be understood by referring to U.S. Publication Patent No. 2005/0231225A1.

Figure 3:
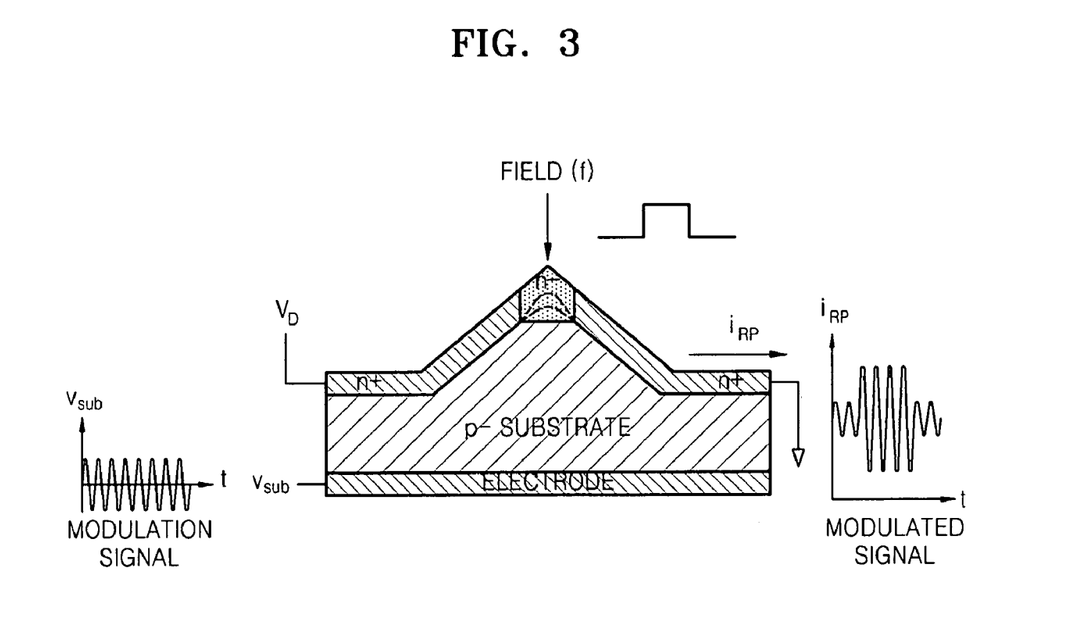
FIG. 3 is a view illustrating an information signal modulated using a modulation signal according to an exemplary embodiment of the present invention.

FIG. 3 is a cross-sectional view illustrating modulation of a signal at a resistive semiconductor tip according to an exemplary embodiment of the present invention.

A p-type layer is formed on a substrate, and an n-type source and drain and a slightly doped n-channel area formed between the n-type source and drain are provided on a surface of the p-type layer. A sine wave having a predetermined frequency is applied to the substrate, and thus the mobility of the n-channel area varies due to the sine wave. Here, an electric field applied from a medium to the n-channel area increases a degree of variation of the mobility of the n-channel area. In other words, the variation in mobility with respect to the electric field is amplified by the sine wave, and thus an amplified signal, i.e., a modulated signal, is output. Here, only a signal formed by the electric field is amplified, and the sine wave does not affect variations in mobility caused by thermal variations, i.e., variations in thermal resistance (a variation in the current). When the signal is modulated by a sine wave, variations in resistance caused by an electric field variation, i.e., an information signal obtained from a medium, may be more greatly amplified than variations in resistance caused by thermal variation.

The information reproducing apparatus and method will now be described in more detail.

Figure 4:
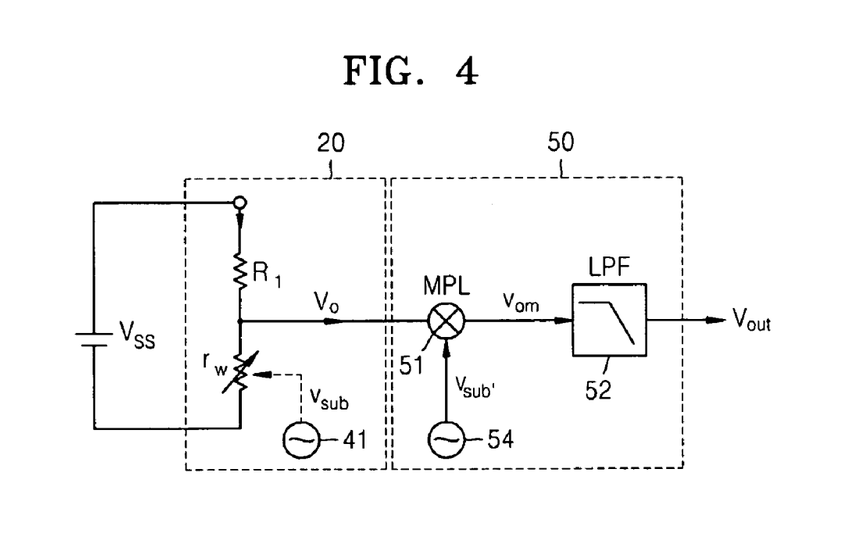
FIG. 4 is a schematic equivalent circuit diagram of an information reproducing apparatus according to an exemplary embodiment of the present invention.

FIG. 4 is a schematic equivalent circuit diagram of an information reproducing apparatus according to an exemplary embodiment of the present invention.

A signal detector 20 shown in FIG. 4 comprises a half bridge circuit including a first resistor R1 connected to a resistance component $r_w$ of a resistive semiconductor probe 30 in series to apply a bias voltage Vss to the resistive semiconductor probe 30 so as to detect an information reproducing signal from a node at which the first resistor R1 and the resistance component $r_w$ of the resistive semiconductor probe 30 are connected to each other. In more detail, a drain electrode 34 of an electric field effect semiconductor tip 31 formed at an end of the resistive semiconductor probe 30 is connected to the first resistor R1, and the bias voltage Vss is applied to the half bridge. Here, a modulation signal generator 41 applies a modulation voltage or a modulation signal $v_{sub}$ to a substrate 33, preferably, to a modulation electrode 35a.

A signal $v_o$ output from the node is connected to a demodulator 50. The demodulator 50 outputs an information signal finally obtained through a multiplier MPL performing a multiplication operation on an input signal and a filter, for example a low pass filter (LPF).

As described above, in an information reproducing apparatus and method according to the exemplary embodiment of the present invention, processes of modulating and demodulating an information signal are performed to improve an SNR. Thus, a noise signal is separately demodulated due to variations in thermal resistance. This will be described below in more detail.

The electric field effect semiconductor tip 31 of the resistive semiconductor probe 30 detects an electric field induced by a medium so as to change mobility, i.e., an electrical resistance. A gap between the electric field effect semiconductor tip 31 and the medium varies with the roughness of a surface of the medium. Thus, an amount of radiated heat varies, which varies the mobility. As a result, a resistance varies. Accordingly, a total resistance $r_w$ of the resistive semiconductor probe 30 is determined by the sum of a pure resistance component Ro, a resistance component $r_f$ varying with a variation in the electric field induced by the medium, and a resistance component $r_t$ caused by thermal instability. The first resistor R1 has a resistance value equal to the pure resistance component Ro, and the modulation signal $v_{sub}$ is a sine wave having a predetermined frequency ω. A voltage of the modulation signal $v_{sub}$ is calculated as in Equation 2:

$$v_{sub} = V_{sub} \sin \omega t. \tag{2}$$

Here, the voltage $v_o$ applied to the resistive semiconductor probe 30 is calculated as in Equation 3:

$$v_o = \frac{R_o + r_f^\omega + r_t}{2R_o + r_f^\omega + r_t} V_{ss} \approx \frac{R_o + r_f^\omega + r_t}{2R_o} V_{ss} \tag{3}$$

wherein a superscript ω of the resistance component $r_f$ means modulation at the frequency ω of the modulation voltage $v_{sub}$.

A demodulator 50 is used to extract the resistance component $r_f$ varying with the electric field from the voltage $v_o$. The demodulator 50 includes a multiplier 51 and an LPF 52. A demodulation signal $v_{sub}'$ having the same frequency as the modulation signal $v_{sub}$ and the same phase as the voltage $v_o$ is multiplied by the voltage $v_o$ using the multiplier 51 to obtain an output voltage $v_{om}$ as in Equation 4:

$$v_{om} = v_0 \times v_{sub} = \frac{1}{2R_o} = \frac{1}{2R_o} V_{ss} V_{sub} \left( \frac{r_f^o + r_f^{2\omega}}{2} + r_t^\omega + R_o^\omega \right) \tag{4}$$

wherein superscripts 0, ω, and 2ω of resistance components denote frequency components.

Accordingly, the output voltage $v_{om}$ passes through the LPF 52 to detect a direct current (DC) component $r_f^0$ having no frequency component ω of the modulation signal $v_{sub}$ so as to detect only the resistance component $r_f$ varying with the electric field.

Figure 5:
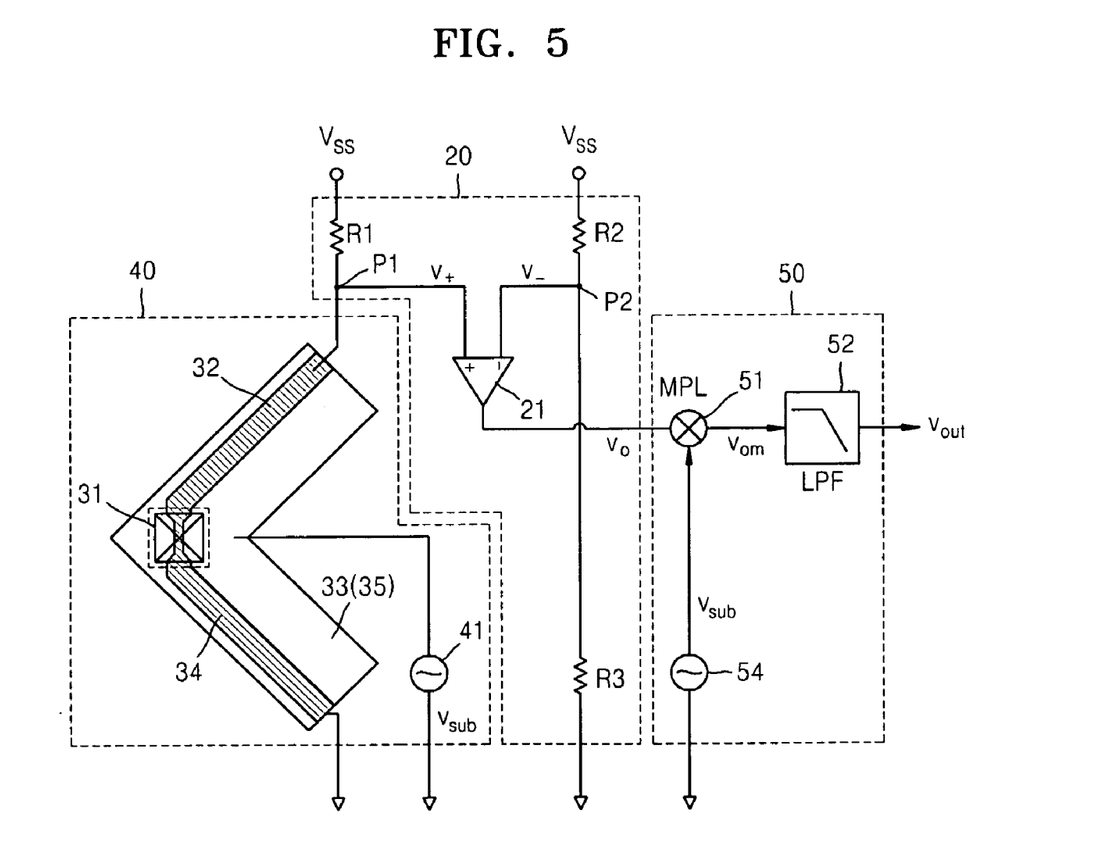
FIG. 5 is a schematic equivalent circuit diagram of an information reproducing apparatus according to another exemplary embodiment of the present invention.

FIG. 5 is a schematic equivalent circuit diagram of an information reproducing apparatus according to another exemplary embodiment of the present invention.

The information reproducing apparatus shown in FIG. 5 detects a modulation signal using a Wheatstone bridge having two branches. The left branch shown in FIG. 5 includes a resistive semiconductor tip 31 and a fist resistor R1 connected to each other in series, and the right branch includes second and third resistors R2 and R3. A drain electrode 34 of the resistive semiconductor tip 31 formed at an end of a probe 30 is grounded, and a source electrode 32 of the resistive semiconductor tip 31 is connected to the first resistor R1. The right branch including the second and third resistors R2 and R3 connected to each other in series is grounded by the third resistor R3. Bias voltages Vss are applied to the left and right branches of the Wheatstone bridge.

A modulation signal generator 41 applies a modulation voltage or a modulation signal $v_{sub}$ to a substrate 33, preferably but not necessarily, to a modulation electrode 35a. A node P1 between the first resistor R1 and the source electrode 32 and a node P2 between the second and third resistors R2 and R3 are respectively connected to a non-inverting input node (+) and an inverting input node (−). An output node of a differential amplifier 21 is connected to a demodulator 50. The demodulator 50 outputs an information signal finally obtained through a multiplier (MPL) 51 and a filter, for example, an LPF 52.

As described above, in an information reproducing apparatus and method according to an exemplary embodiment of the present invention, processes of modulating and demodulating an information signal are performed to improve an SNR. Thus, a noise signal is separately demodulated due to variations in thermal resistance. This will be described below in more detail.

The resistive semiconductor tip 31 of the probe 30 detects an electric field induced by a medium so as to change mobility, i.e., an electrical resistance. A gap between the resistive semiconductor tip 31 and the medium varies with the roughness of a surface of the medium. Thus, an amount of radiated heat varies, which varies the mobility. As a result, a variation in resistance occurs. The total resistance $r_w$ of the probe 30 is determined by the sum of a pure resistance component Ro of the resistive semiconductor tip 31, a resistance component $r_f$ varying with a variation in the electric field induced by the medium, and a resistance component $r_t$ caused by thermal instability. The first resistor R1 has a resistance value equal to the pure resistance component Ro, the second resistor R2 has the same resistance value as the third resistor R3, and the modulation signal $v_{sub}$ is a sine wave having a predetermined frequency ω. The voltage of the modulation signal $v_{sub}$ is calculated as in Equation 5:

$$v_{sub} = V_{sub} \sin \omega t. \quad (5)$$

Here, a node voltage $v_+$ of the Wheatstone bridge is calculated as in Equation 6:

$$v_+ = \frac{R_o + r_f^\omega + r_t}{2R_o + r_f^\omega + r_t} V_{ss} \approx \frac{R_o + r_f^\omega + r_t}{2R_o} V_{ss} \quad (6)$$

wherein a superscript ω of the resistance component $r_f$ varying with the electric field means modulation at a frequency ω of the modulation voltage $v_{sub}$. The right branch of the Wheatstone bridge is formed by the second and third resistors R2 and R3 to remove an offset voltage. A node voltage $v_-$ of the right branch is calculated as in Equation 7:

$$v_- = \frac{V_{ss}}{2}. \quad (7)$$

The node voltages $v_+$ and $v_-$ of the left and right branches are amplified using a differential amplifier 21 having a gain A to obtain an output voltage $v_o$ calculated as in Equation 8:

$$v_o = A(v_+ - v_-) = \frac{r_f^\omega + r_t}{2R_o} A V_{ss} \quad (8)$$

A demodulator 50 is used to extract the resistance component $r_f$ varying with the electric field from the voltage $v_o$. The demodulator 50 includes a multiplier 51 and an LPF 52. A voltage $v_o$ output from the differential amplifier 21 is multiplied by a demodulation signal $v_{sub}'$ having the same frequency as the modulation signal $v_{sub}$ and the same phase as the voltage $v_o$ using the multiplier 51 to obtain an output voltage $v_{om}$.

$$v_{om} = v_0 \times v_{sub} = \frac{1}{2R_o} A V_{ss} V_{sub} \left( \frac{r_f^o + r_f^{2\omega}}{2} + r_t^\omega \right) \quad (9)$$

wherein superscripts 0, ω, and 2ω of resistance components denote frequency components.

Only a DC component is detected using the LPF 52 so as to detect only the resistance component $r_f$ varying with the electric field.

An information reproducing apparatus and method according to another exemplary embodiment of the present invention will now be described.

Figure 6:
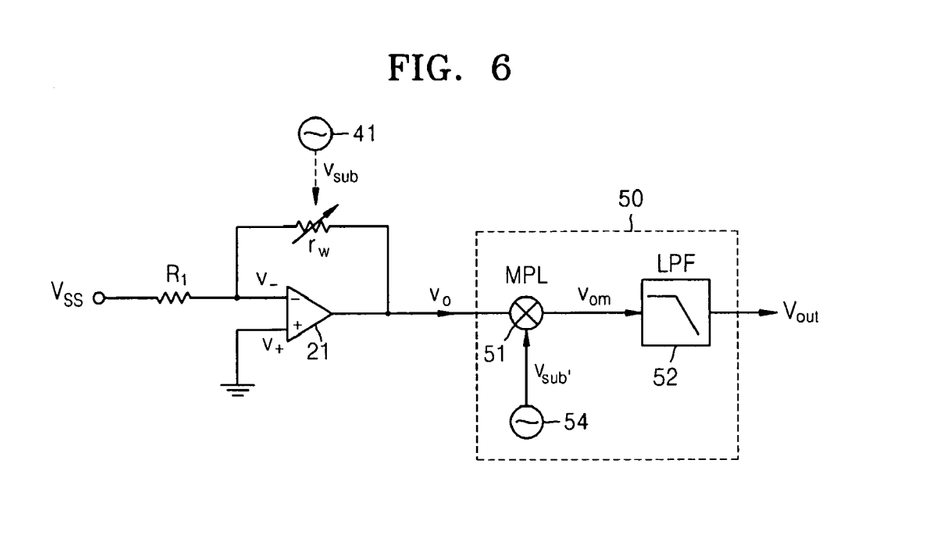
FIG. 6 is a schematic equivalent circuit diagram of an information reproducing apparatus according to another exemplary embodiment of the present invention.

Referring to FIG. 6, a voltage may be applied to a semiconductor probe using an inverting amplifier circuit including an operational amplifier forming a feedback loop, and a signal may be detected at an output node of the operational amplifier. A source electrode 32 of a resistive semiconductor tip 31 formed at a front end of a resistive probe 30 is connected to an output node of an operational amplifier 21, and a drain electrode 34 of the resistive semiconductor tip 31 is connected to an inverting input node (−) of the operational amplifier 21. A first resistor R1 is connected to the inverting input node (−) of the operational amplifier 21, and a bias voltage Vss is applied to the first resistor R1. A non-inverting input node (+) is grounded. The output node of the operational amplifier 21 is connected to a demodulator 50. The demodulator 50 includes a multiplier 51 and a filter, for example, an LPF 52.

As described above, the total resistance $R_w$ of the resistive semiconductor tip 31 is determined by the sum of a nominal resistance $R_0$, a resistance component $r_f$ varying with an electric field, and a resistance component $r_t$ caused by a thermal variation. The first resistor R1 has a resistance value equal to the nominal resistance $R_0$ of the resistive semiconductor tip 31. A modulation signal as a sine wave having a predetermined frequency ω or a modulation voltage $v_{sub}$ is applied to a substrate 33 or a modulation electrode 35a.

$$v_{sub} = V_{sub} \sin \omega t \quad (10)$$

Here, an impedance of the non-inverting input node (+) is infinite, and thus the voltage vo output from the operation amplifier 21 is calculated using Equation 11:

$$v_o = \frac{R_o + r_f^\omega + r_t}{R_1} V_{ss} \approx \left[ 1 + \frac{r_f^\omega}{R_o} + \frac{r_t}{R_o} \right] V_{ss} \quad (11)$$

wherein a superscript ω of the resistance component $r_f$ varying with the electric field means modulation at the frequency ω of the modulation voltage $v_{sub}$. The resistance component $r_f$ varying with the electric field is obtained from a demodulator 50. The demodulator 50 includes a multiplier 51 and an LPF 52. The voltage $v_o$ output from the operational amplifier 21 is multiplied by the demodulation signal $v_{sub}'$ having the same frequency as the modulation signal $v_{sub}$ and the same phase as the voltage $v_o$ using the multiplier 51 to obtain an output voltage $v_{om}$ as in Equation 12:

$$v_{om} = v_o \times v_{sub} = \left[ v_{sub} + \frac{r_f^o + r_f^{2\omega}}{2R_o} V_{sub} + \frac{r_t^\omega}{R_o} V_{sub} \right] V_{ss} \quad (12)$$

wherein superscripts 0, ω, and 2ω of resistance components denote frequency components. Only the resistance component $r_f$ filtered by the LPF 52 and varying with the electric field may be detected.

As described above, in an exemplary embodiment of the present invention, a signal output from a semiconductor tip including a noise signal generated by a thermal variation is modulated into a signal having a predetermined frequency. Thus, only a signal generated by a resistance varying with an electric field is modulated and demodulated so as to obtain a pure information signal having no noise signal.

Figure 7:
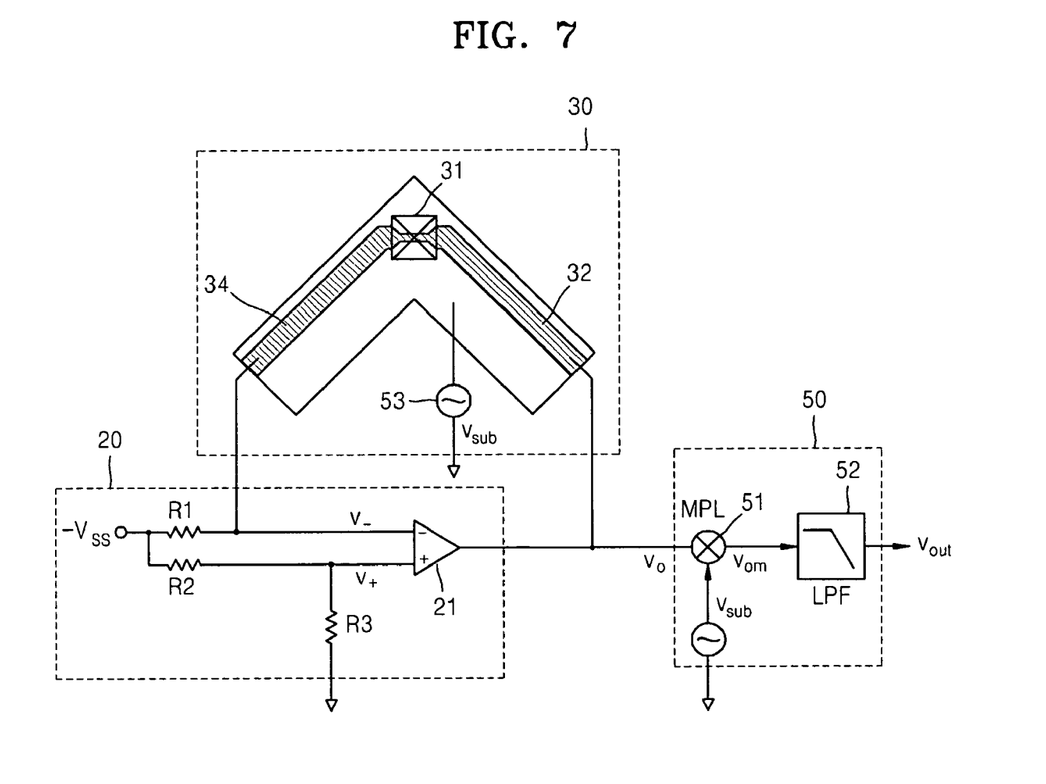
FIG. 7 is a schematic equivalent circuit diagram of an information reproducing apparatus according to another exemplary embodiment of the present invention.

Referring to FIG. 7, a source electrode 32 of a resistive semiconductor tip 31 formed at a front end of a resistive probe 30 is connected to an output node of an operational amplifier 21, and a drain electrode 34 of the resistive semiconductor tip 31 is connected to an inverting input node (−) of the operational amplifier 21. First and second resistors R1 and R2 are respectively connected to the inverting input node (−) and a non-inverting input node (+) of the operational amplifier 21, and a bias voltage Vss is applied to the first and second resistors R1 and R2. The second resistor R2 and a third resistor R3 of a voltage splitter are connected to the non-inverting node (+). The output node of the operational amplifier 21 is connected to a demodulator 50. The demodulator 50 includes a multiplier 51 and a filter, for example, an LPF 52.

As described above, the total resistance Rw of the resistive semiconductor tip 31 is determined by the sum of a nominal resistance $R_0$, a resistance component $r_f$ varying with an electric field, and a resistance component $r_t$ varying with a thermal variation. The first resistor R1 has a resistance value equal to the nominal resistance $R_0$ of the resistive semiconductor tip 31. A modulation signal as a sine wave having a predetermined frequency ω or a modulation voltage $v_{sub}$ is applied to a substrate 33 or a modulation electrode 33a.

$$v_{sub} = V_{sub} \sin \omega t \tag{13}$$

Here, potentials V+ and V− of the non-inverting input node (+) and the inverting input node (−) are expressed as in Equations 14 and 15:

$$v_+ = -\frac{V_{ss}}{2} \tag{14}$$

$$v_- = -\frac{V_{ss}}{2}. \tag{15}$$

An impedance of the non-inverting input node (+) is infinite, and thus a current equation is expressed as in Equation 16:

$$\frac{-V_{ss} - v_-}{R_o} + \frac{v_o - v_-}{R_o + r_f^\omega + r_t} = 0 \tag{16}$$

Here, an output voltage of the operational amplifier 21 is calculated as in Equation 17:

$$v_o = \frac{r_f^\omega + r_t}{2R_o} V_{ss} \tag{17}$$

wherein a superscript ω of the resistance component $r_f$ varying with the electric field means modulation at the frequency ω of the modulation voltage $v_{sub}$. The resistance component $r_f$ varying with the electric field is obtained from a demodulator 50. The demodulator 50 includes a multiplier 51 and an LPF 52. The output voltage $v_o$ of the operational amplifier 21 is multiplied by the modulation voltage $v_{sub}$ using the multiplier 51 to obtain an output voltage $v_{om}$.

$$v_{om} = v_0 \times v_{sub} = \frac{1}{2R_o} V_{ss} V_{sub} \left( \frac{r_f^o + r_f^{2\omega}}{2} + r_t^\omega \right) \tag{18}$$

wherein superscripts 0, ω, and 2ω of resistance components denote frequency components. Only the resistance component $r_f$ filtered by the LPF 52 and varying with the electric field may be detected.

As described above, in the present invention, a signal output from a semiconductor tip including a noise signal generated by a thermal variation is modulated into a signal having a predetermined frequency. Thus, only a signal generated by a resistance varying with an electric field is modulated and demodulated so as to obtain a pure information signal having no noise signal.

Figure 8:
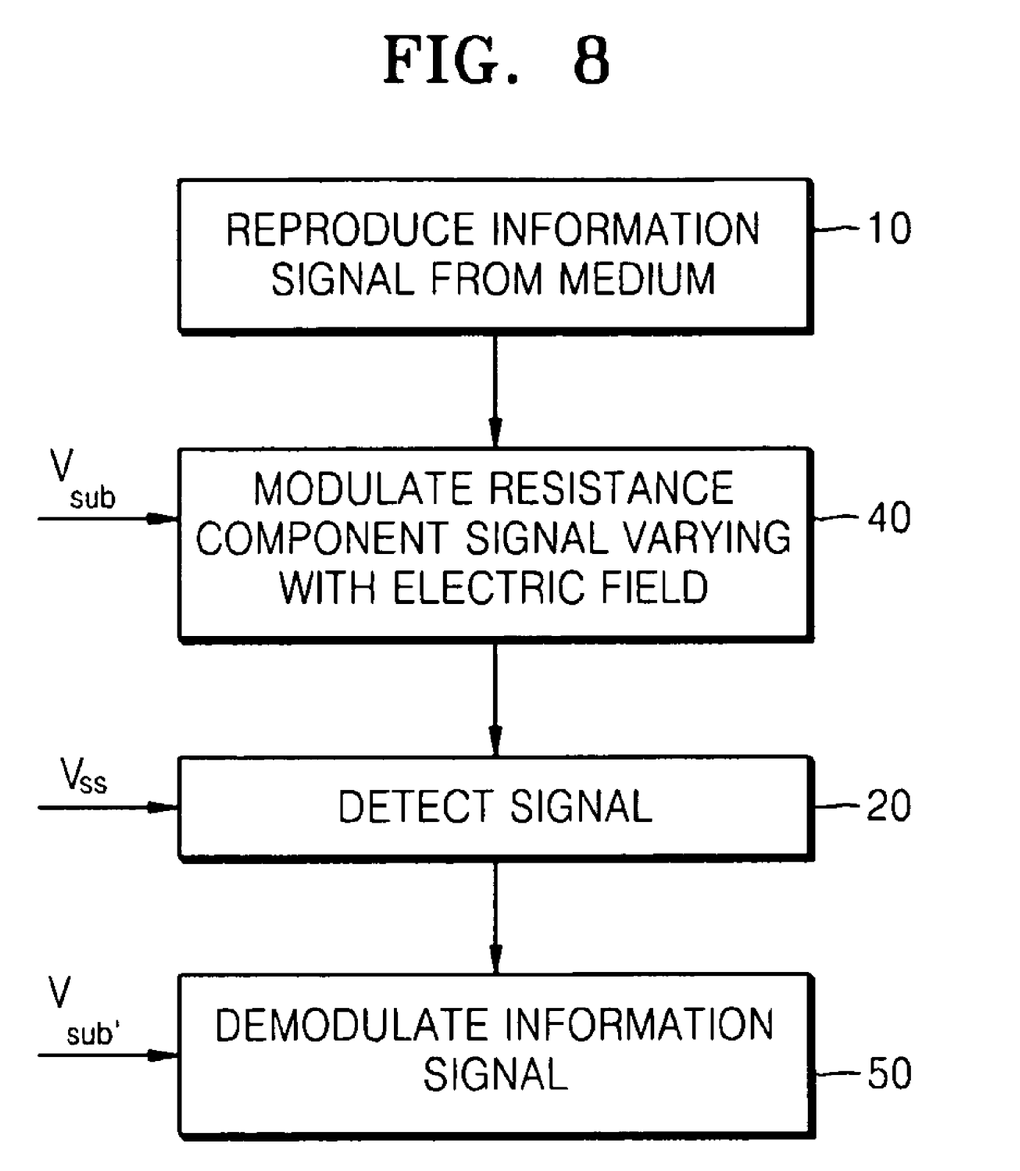
FIG. 8 is a flowchart of an information reproducing method according to an exemplary embodiment of the present invention.

FIG. 8 is a flowchart of an information reproducing method according to an exemplary embodiment of the present invention.

In operation 10, an electric field generated by information recorded on a medium is generated by charges or dipole moments trapped on a surface of the medium. A channel area of a semiconductor probe 30 varies with the electric field, and thus a resistance of the semiconductor probe 30 varies. A driving voltage is applied to the semiconductor probe 30 to generate a signal including a pure resistance component of the semiconductor probe, the resistance component varying with the electric field, and a resistance component varying with variations in thermal resistance.

In operation S40, a high frequency modulation signal $V_{sub}$ is applied to the semiconductor probe 30 to form a modulation electric field so as to modulate only the resistance component signal varying with the electric field.

In operation S20, the signal detected by applying the driving voltage to the semiconductor probe 30 may be determined by the sum of a signal modulated by the modulation signal, i.e., the modulated resistance component signal varying with the electric field, the pure resistance component of the semiconductor probe, and the resistance component varying with the thermal resistance variation.

The semiconductor probe may include a voltage divider circuit to divide the bias voltage Vss so as to extract a signal generated by the semiconductor probe. The voltage divider circuit may be a bridge circuit or an operational amplifier circuit having a feedback loop. Here, operations of removing an offset voltage generated during the division of the voltage and amplifying the detected signal may be further included. The detailed contents of this are as described with reference to FIGS. 4 through 7.

In operation S50, an information signal modulated by the modulation electric field is extracted from the detected signal. Operation S50 includes multiplying the detected signal by a demodulation signal and extracting a signal of a frequency domain lower than a predetermined frequency from the signal obtained by the multiplication. The demodulation signal has the approximately same frequency as the modulation signal and the approximately same phase as the detected signal. The detailed contents of this are as described with reference to FIGS. 4 through 7.

Figure 9:
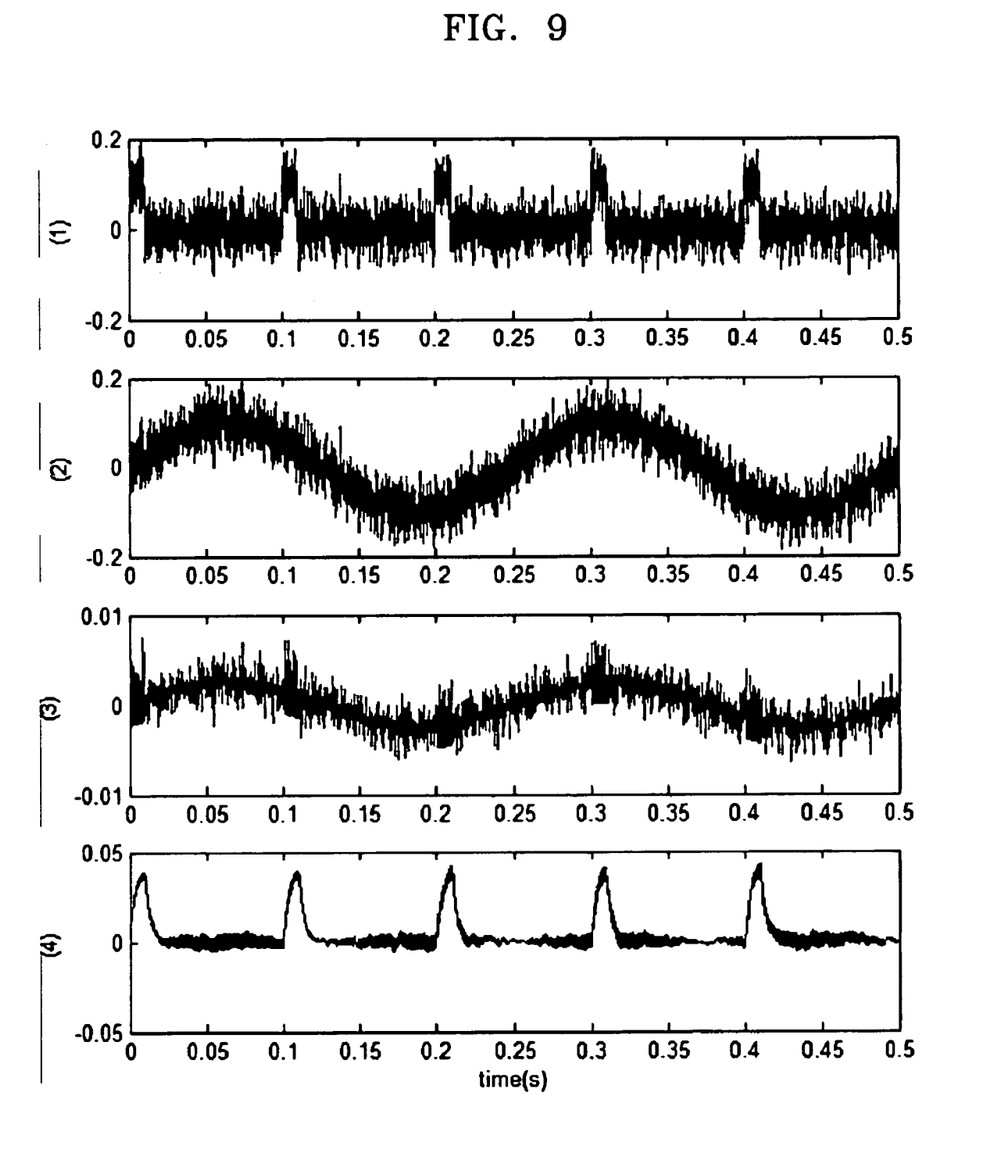
FIGS. 9 and 10 are graphs illustrating increases in an SNR simulated using an information reproducing apparatus and method according to an exemplary embodiment of the present invention.
Figure 10:
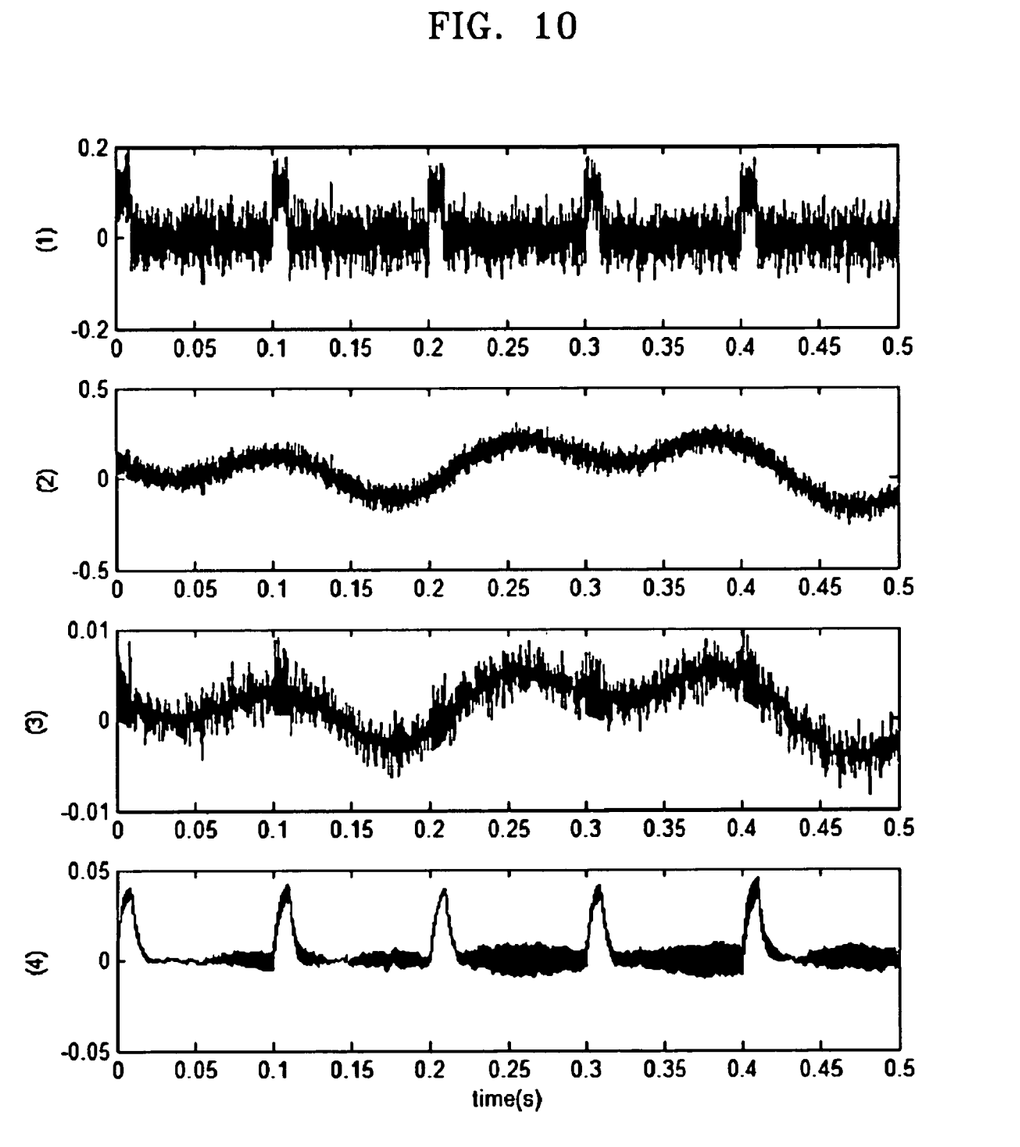

FIGS. 9 and 10 are graphs showing results of simulations of the exemplary embodiment of FIG. 5 performed using a Wheatstone bridge and a differential amplifier as a signal detector.

As shown in FIG. 9, a first waveform diagram (1) shows a waveform of a resistance component $r_f$ varying with an electric field, a second waveform diagram (2) shows a waveform of a resistance component $r_t$ varying with variations in thermal resistance, a third waveform diagram (3) shows an output waveform of a differential amplifier, and a fourth waveform diagram (4) shows a resistance waveform varying with the electric field through a demodulation of an output of the differential amplifier.

FIG. 10 is a graph illustrating results of simulations of a resistance varying with a sum of three sine waves having different frequencies. In other words, a first waveform diagram (1) shows a waveform of a resistance component $r_f$ varying with an electric field, a second waveform diagram (2) shows a waveform of a resistance component $r_t$ (referred to as a sum wave of three sine waves) varying with variations in thermal resistance, a third waveform diagram (3) shows an output waveform of a differential amplifier, and a fourth waveform diagram (4) shows a waveform of a resistance varying with the electric field which is obtained through demodulation of an output of the differential amplifier.

As described above, in an information reproducing apparatus and method according to the present invention, an information signal obtained from a medium can be successfully obtained from a noise signal generated by thermal instability. In particular, an SNR can be improved through modulation and demodulation processes. Thus, information can be reproduced with high sensitivity.

A signal generated by an electric field can be detected separately from a signal generated by a thermal variation due to the modulation process to detect a further effective information signal so as to improve the SNR. Thus, the information signal can be stably reproduced in spite of thermal noise.

The present invention may be applied to various fields using electric field effect transistor type probes, particularly, to information reproducing fields.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An information reproducing apparatus using a semiconductor probe, the apparatus comprising:
   the semiconductor probe comprising a semiconductor tip comprising a channel varying with an electric field generated by an information recording medium;
   a modulator which applies a high frequency modulation signal to the semiconductor probe to form a modulation electric field so as to modulate an information signal induced by the electric field generated by the information recording medium;
   a signal detector which detects a signal generated by the semiconductor probe; and
   a demodulator which extracts the information signal modulated by the modulation electric field from the signal detected by the signal detector.

2. The information reproducing apparatus of claim 1, wherein:
   the semiconductor tip is formed of a p-type semiconductor, a portion at a peak of the tip comprising the channel varying with the electric field, source and drain areas doped with n-type impurities and formed at inclined surfaces of the tip, and a cantilever having an end portion on which the tip is provided and formed of a p-type semiconductor; and
   the modulator comprises a high frequency modulation signal generator and an electrode provided in the cantilever, the electrode receiving the high frequency modulation signal from the high frequency modulation signal generator.

3. The information reproducing apparatus of claim 1, wherein:
   the semiconductor tip is formed of a p-type semiconductor, and a cantilever provided at an end of the tip and formed of the p-type semiconductor, wherein a portion at the peak of the tip is doped with n-type impurities and the portion at the peak of the tip comprises the channel, and source and drain areas doped with n-type impurities to a high density and formed at inclined surfaces of the tip; and
   the modulator comprises a high frequency modulation signal generator and an electrode provided in the cantilever, the electrode receiving the high frequency modulation signal from the high frequency modulation signal generator.

4. The information reproducing apparatus of claim 1, wherein the high frequency modulation signal is a sine wave signal.

5. The information reproducing apparatus of claim 4, wherein the high frequency modulation signal is a high frequency signal at least 5 times higher than a frequency of the electric field generated by the information recording medium.

6. The information reproducing apparatus of claim 2, wherein the high frequency modulation signal is a sine wave signal.

7. The information reproducing apparatus of claim 6, wherein the high frequency modulation signal is a high frequency signal at least 5 times higher than a frequency of the electric field generated by the information recording medium.

8. The information reproducing apparatus of claim 3, wherein the high frequency modulation signal is a sine wave signal.

9. The information reproducing apparatus of claim 8, wherein the high frequency modulation signal is a high frequency signal at least 5 times higher than a frequency of the electric field generated by the information recording medium.

10. The information reproducing apparatus of claim 1, wherein the demodulator comprises:
    a multiplier which multiplies the signal detected by the signal detector by a demodulation signal; and
    a low pass filter (LPF) which extracts a signal of a frequency domain lower than a predetermined frequency from a signal output from the multiplier,
    wherein the demodulation signal has an approximately identical frequency to the modulation signal and an approximately identical phase to the signal detected by the signal detector.

11. The information reproducing apparatus of claim 10, wherein a cut-off frequency of the LPF is at least 10 times lower than a frequency of the modulation signal.

12. The information reproducing apparatus of claim 1, further comprising a voltage divider which applies a divided voltage to the semiconductor probe to detect the signal.

13. The information reproducing apparatus of claim 12, wherein the voltage divider is a bridge circuit comprising one or more resistors and the semiconductor probe.

14. The information reproducing apparatus of claim 13, wherein the demodulator comprises:
    a multiplier which multiplies the signal detected by the signal detector by a demodulation signal; and
    an LPF which extracts a signal of a frequency domain lower than a predetermined frequency from a signal output from the multiplier,
    wherein the demodulation signal has an identical frequency to the modulation signal and an identical phase to the signal detected by the signal detector.

15. The information reproducing apparatus of claim 13, wherein the bridge circuit is a half bridge circuit comprising the semiconductor probe and a resistor,
    wherein the resistor is connected to the semiconductor probe in series and the signal is detected from a node between the resistor and the semiconductor probe.

16. The information reproducing apparatus of claim 13, wherein the bridge circuit is a Wheatstone bridge comprising the semiconductor probe and first through third resistors, and the information reproducing apparatus further comprises a differential amplifier, wherein one of inverting and non-inverting input nodes of the differential amplifier is connected to one of a first half bridge connection node, which is located at a connection between the semiconductor probe and the first resistor, and a second half bridge connection node, which is located at a connection between the second and third resistors, and the signal is detected at the output node of the differential amplifier.

17. The information reproducing apparatus of claim 16, wherein a resistance value of the first resistor is approximately equal to a resistance value of a pure resistance component of the semiconductor probe, and resistance values of the second and third resistors are approximately equal to each other.

18. The information reproducing apparatus of claim 17, wherein the demodulator comprises:
   a multiplier which multiplies the signal detected by the signal detector by a demodulation signal; and
   a low pass filter (LPF) which extracts a signal of a frequency domain lower than a predetermined frequency from a signal output from the multiplier,
   wherein the demodulation signal has an approximately identical frequency to the modulation signal and an approximately identical phase to the signal detected by the signal detector.

19. The information reproducing apparatus of claim 12, wherein the voltage divider is an inverting amplifier circuit comprising one or more resistors and an operational amplifier forming a feedback loop through the semiconductor probe.

20. The information reproducing apparatus of claim 19, wherein the demodulator comprises:
   a multiplier which multiplies the signal detected by the signal generator by a demodulation signal; and
   a low pass filter (LPF) which extracts a signal of a frequency domain lower than a predetermined frequency,
   wherein the demodulation signal has an identical frequency to the modulation signal and an identical phase to the signal detected by the signal detector.

21. A method of reproducing information from an information recording medium using a semiconductor probe comprising a semiconductor tip comprising a channel varying with an electric field generated by the information recording medium, the method comprising:
   applying a high frequency modulation signal to the semiconductor probe to form a modulation electric field so as to modulate an information signal induced by the electric field generated by the information recording medium;
   detecting a signal generated by the semiconductor probe; and
   extracting the information signal modulated by the modulation electric field from the detected signal.

22. The method of claim 21, wherein the extracting of the information signal modulated by the modulation electric field from the detected signal comprises:
   multiplying the detected signal by a demodulation signal; and
   extracting a signal of a frequency domain lower than a predetermined frequency from a signal obtained by the multiplication,
   wherein the demodulation signal has an approximately identical frequency to the modulation signal and an approximately identical phase to the signal detected by the signal detector.

23. The method of claim 21, wherein, in detecting the signal generated by the semiconductor probe, a divided voltage is applied to the semiconductor probe.

24. The method of claim 23, wherein the extracting of the signal of the frequency domain lower than the predetermined frequency from the signal obtained from the multiplication comprises removing an offset voltage from the divided voltage and amplifying the detected signal.

* * * * *